United States Patent [19]

Blass et al.

[11] 4,305,476
[45] Dec. 15, 1981

[54] CONSTANT TRACK TENSION SYSTEM FOR SNOWMOBILES

[75] Inventors: Jaroslav Blass, Chaska; Gerald S. Rychlock, Jordan, both of Minn.

[73] Assignee: Kawasaki Motors Corp., U.S.A., Santa Ana, Calif.

[21] Appl. No.: 46,097

[22] Filed: Jun. 6, 1979

[51] Int. Cl.³ .............................................. B62D 55/30
[52] U.S. Cl. ..................................... 180/9.54; 305/22
[58] Field of Search ............... 180/190, 192, 193, 194, 180/195, 196, 9, 9.2 R, 9.2 C, 9.24 A, 9.5, 9.52, 9.54, 185; 305/21, 22, 23, 24, 25, 35 EB

[56] References Cited

U.S. PATENT DOCUMENTS

| | | | |
|---|---|---|---|
| 1,368,652 | 2/1921 | Pennington | 305/22 |
| 1,404,052 | 1/1922 | Palm | 180/185 |
| 3,362,492 | 1/1968 | Hansen | 180/9.2 |
| 3,610,356 | 10/1971 | Byar | 180/9.24 |
| 3,705,637 | 12/1972 | Harvey | 180/9.58 |
| 3,863,727 | 2/1975 | Michrina | 180/9.2 |

*Primary Examiner*—Robert R. Song
*Assistant Examiner*—Randall A. Schrecengost
*Attorney, Agent, or Firm*—Poms, Smith, Lande & Rose

[57] ABSTRACT

A system for maintaining substantially uniform tension in an endless track for a track driven vehicle having a vehicle body and a suspension assembly and in which a tensioned endless track passes around end support and guide members, one of said end support and guide members being imparted vertical and some horizontal displacement relative to a rigid frame upon response of the suspension system to variations in loading and/or to terrain irregularities. The constant tension system provides a cam member having a cam surface in contact with the bottom surface of the top lay of the endless track, the cam member being supported by the suspension system and movable in correlation with movements of the suspension system so that differences in track length or track tension caused by movement of the suspension system will be compensated for and substantially uniform track tension will be maintained during travel of the suspension system. A method of minimizing variations in tension or length of an endless track means on a snowmobile including presetting a selected tension in the endless track while the suspension system is in one position, and nonlinearly compensating for variations in tension forces acting upon said endless track during changes in position of at least one of said end support means and associated suspension system.

7 Claims, 8 Drawing Figures

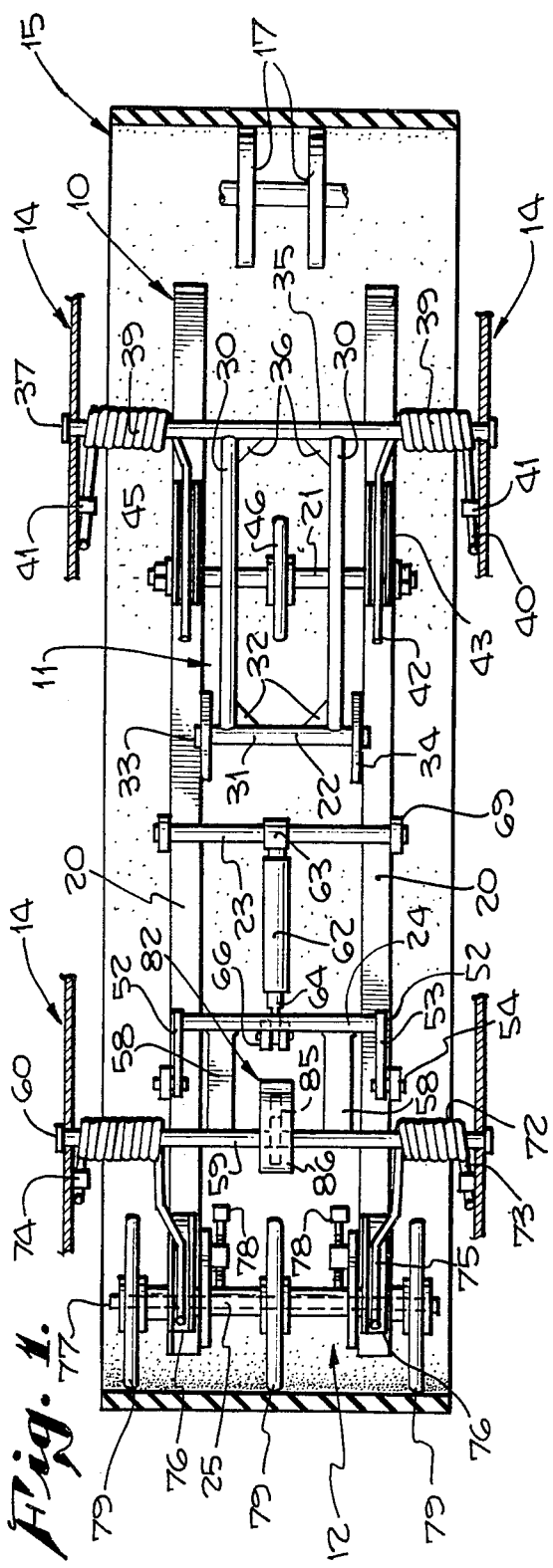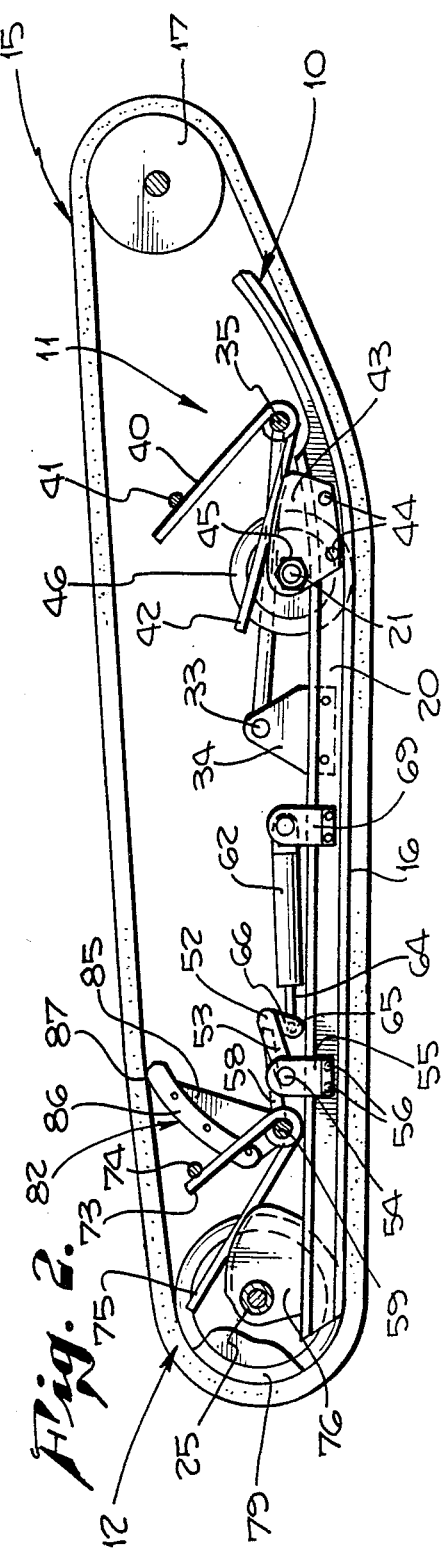

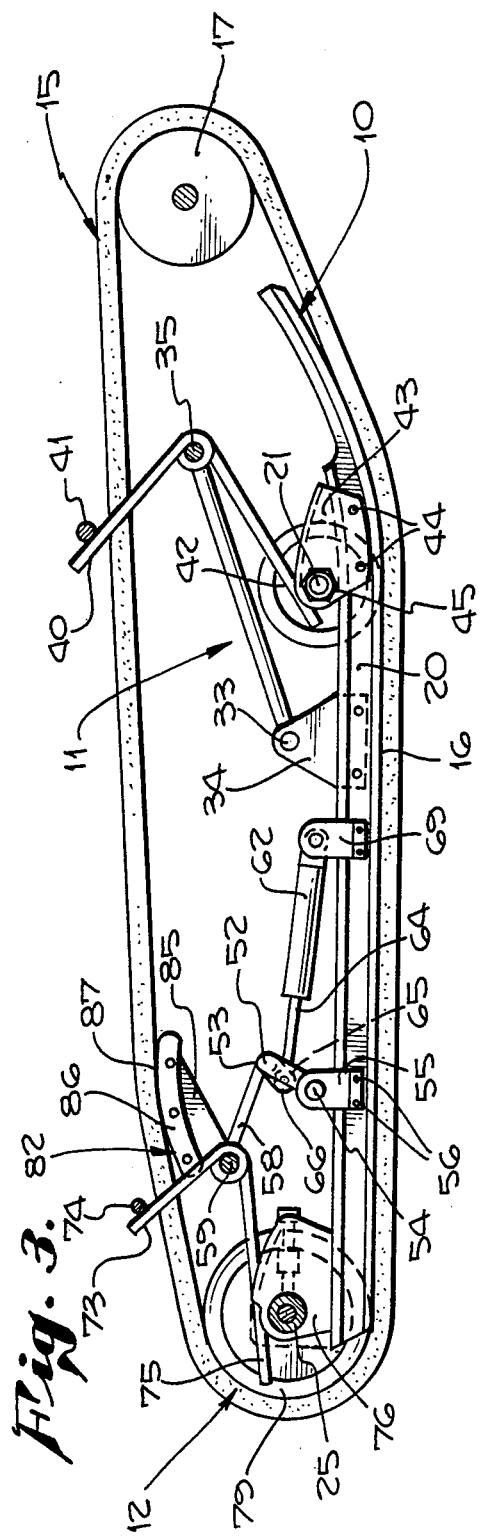
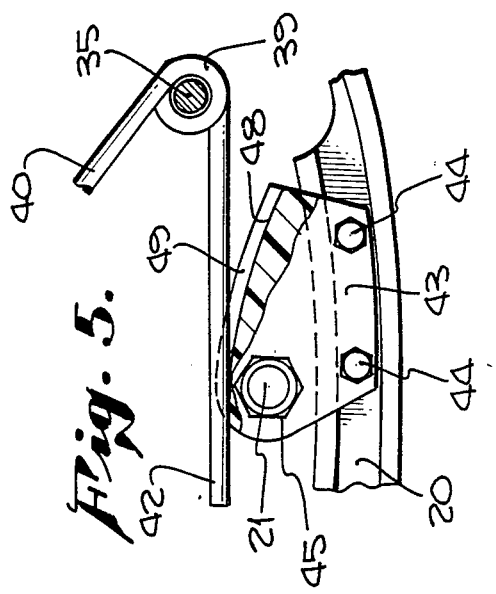
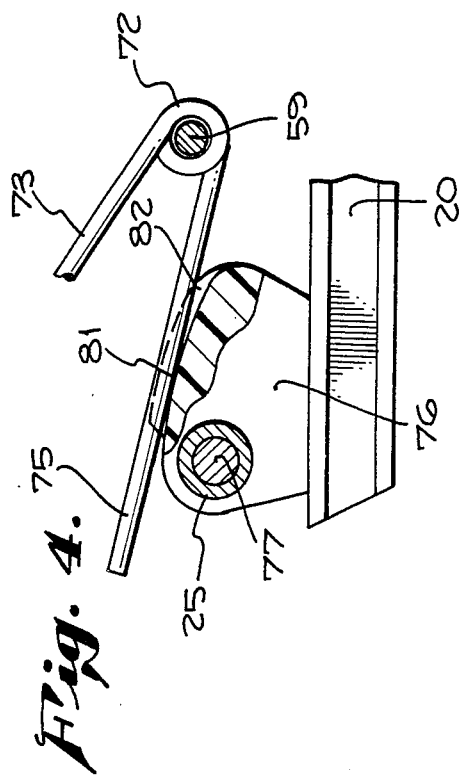

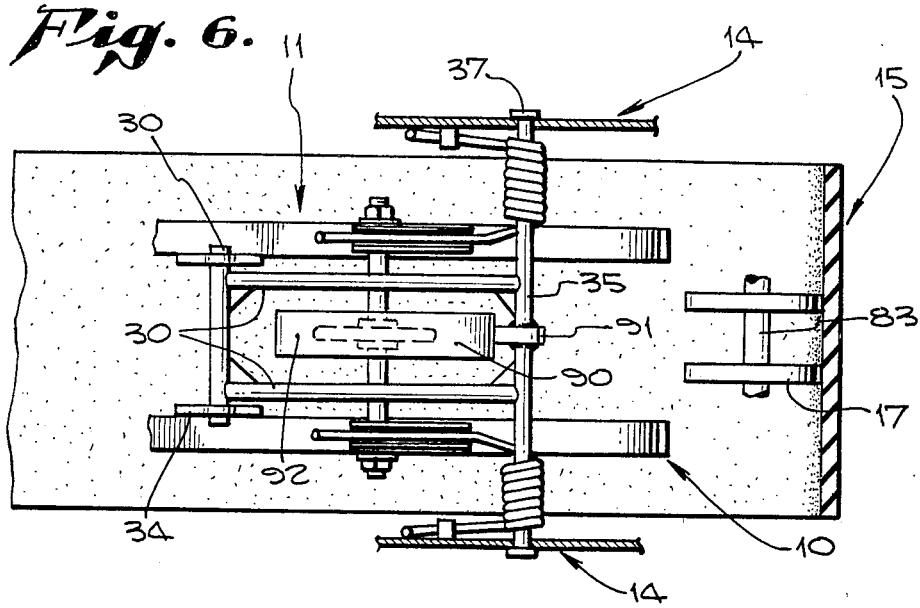
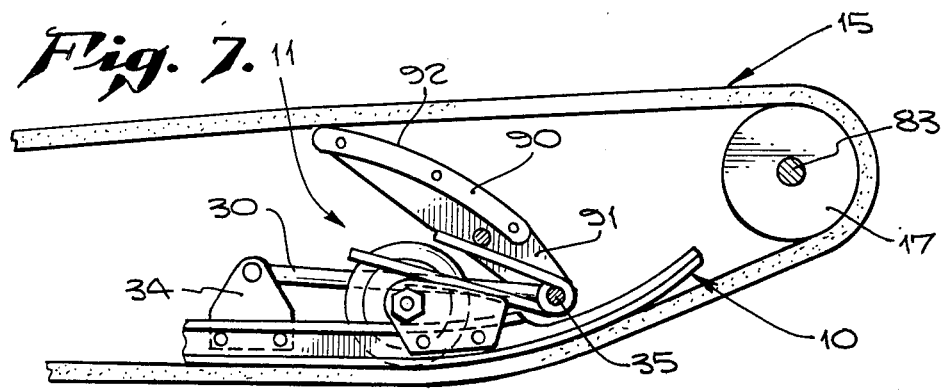
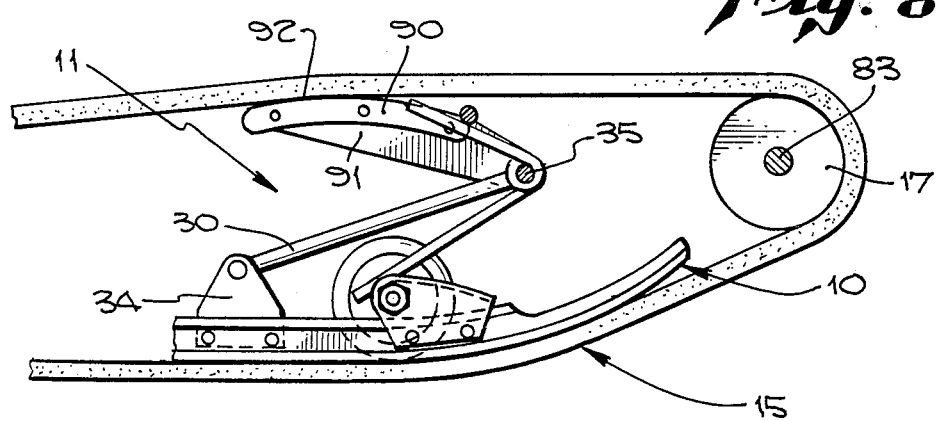

CONSTANT TRACK TENSION SYSTEM FOR SNOWMOBILES

BACKGROUND OF THE INVENTION

This invention generally relates to endless track driven vehicles such a snowmobiles and more particularly to means associated with the suspension system of the vehicle for maintaining the endless driving track under substantially uniform tension and track length.

Variations in track tension and/or track length detrimentally effect several operating conditions of the endless track. One undesirable result is in relation to rolling resistance, that is resistance between idle and drive wheels engaged with the endless track and also resistance between the track and the ground surface. Variations in track tension effect the power transmitted to the endless track and also the power transmitted from the endless track to propel the vehicle. Another undesirable effect is that track life is shortened or decreased because of continual stressing of the track material causing uneven or undue wear and fatigue. Variation in track tension is also related to suspension compliance in that movement of the suspension system is responded to by a varying stress on the endless track. It is, therefore, desirable that an endless track for a track driven type vehicle be maintained at a substantially uniform constant tension under varying conditions of loading, terrain and operation in order to optimize the performance of the track driven vehicle.

It will be understood that endless track vehicles may be provided with different suspension system in which the attempt to maintain uniform track tension is sought by variough systems. For example, in U.S. Pat. No. 3,863,727, an endless track passes around two spaced fixed axes and the bottom lay of the track is biased away from the plane of the fixed axes by pneumatic springs. In this system , the track does not flex at the lower ground engaging lay.

In U.S. Pat. No. 3,362,492 bogey wheels are provided between top and bottom lays of an endless track to maintain pressure against the lower lay of the track. In U.S. Pat. No. 3,610,356 the top surface of the upper lay of an endless track is engaged by a tension roller.

In U.S. Pat. No. 3,705,637 tension on an endless track is controlled by torsion springs mounted on members of the suspension system, the torsion springs being connected to a frame which carries idle wheels which exert a downward pressure against the bottom lay of the track.

In such prior proposed endless track systems, the travel of the suspension systems are relatively limited and the pressure against one of the lays of the endless track is maintained by a separate pressure biasing system which is usually not related to movement of the suspension system.

Changes in variation of length of track results in noticeable changes in track tension in terms of pounds and thereby directly effects operating characteristics of the track vehicle and maintenance of the endless track.

SUMMARY OF THE INVENTION

The present invention contemplates a novel means and method for controlling variation in track length or variation in track tension of an endless track means used on a track driven vehicle such as a snowmobile. The invention contemplates such a means and method for controlling variation of track tension in association with a suspension system for the vehicle in which suspension travel has been maximized. The invention further contemplates a novel means and method for maintaining substantially uniform track tension in a track driven vehicle which obviates many of the disadvantages of prior means for controlling track tension and which may be readily adapted to suspension systems other than the exemplary suspension system described hereinafter.

The primary object of the present invention therefore is to provide a novel means and method for minimizing variations in tension of an endless track means for use on an endless track driven vehicle.

An object of the invention is provide a means and method for relating movement of the suspension system to the endless track means for minimizing variations in tension in the track means which might be caused by such movement of the suspension system during loading and during travel over terrain.

Another object of the present invention is to provide cam means for engagement with one of the lays of an endless track means for maintaining substantially uniform tension in the track means.

A further object of the present invention is to provide a system for controlling variations in tension of an endless track means wherein one or more cam means are associated with the suspension system and the endless track means for effectively maintaining substantially uniform tension and length of the track means during operating conditions.

The invention particularly contemplates an endless track means for a vehicle such as a snowmobile in which the suspension system comprises suspension frames movable about pivot axes in response to forces acting upon the vehicle and in which at least one of said suspension frames includes a cam member supported for movement therewith and having engagement with the undersurface of the top lay of the endless track means. The cam member has a cam edge configured so as to correlate the movment of its supporting suspension system to the relative position of the cam edge on the cam member in contact with the lay of the endless track means so that the endless track means will be maintained under a selected tension.

Various other objects and advantages of the present invention will become readily apparent from the following description of the drawings in which exemplary embodiments of the invention are shown.

IN THE DRAWINGS

FIG. 1 is a top plan view of a snowmobile construction embodying a constant tension track system of this invention, the portions in section being part of the vehicle body and the phantom lines indicating drive sprockets engaged with the endless track.

FIG. 2 is a side view of FIG. 1, the suspension system being shown in collapsed condition or under one loading condition.

FIG. 3 is a side view similar to FIG. 2 but showing the suspension system in generally normal position or under another loading condition.

FIG. 4 is an enlarged fragmentary view of the rear cam and torsion spring arm of the suspension system.

FIG. 5 is an enlarged fragmentary side view of the front cam and front torsion spring arm of the suspension system.

FIG. 6 is a fragmentary top plan view of the front end of the snowmobile construction shown in FIG. 1 illustrating the constant track tension system of this invention applied to both front and rear portions of the suspension system.

FIG. 7 is a fragmentary side view of FIG. 6 illustrating one condition of the suspension system and constant tension system of this invention.

FIG. 8 is a fragmentary side view similar to FIG. 7 illustrating the suspension system and constant tension system of this invention in another position with the suspension system in generally normal position.

DETAILED DESCRIPTION OF PREFERRED EMBODIMENT

In FIGS. 1–5 inclusive, an exemplary constant track tension means embodying this invention is shown associated with a suspension system which is described and claimed in copending application Ser. No. 963,913 owned by a common assignee. The exemplary suspension system provides maximized suspension travel which normally is reflected in increased variations in track length and track tension. The constant tension track means of this invention is exemplarily correlated with such maximized suspension travel and to facilitate explanation, the suspension system, which does not form part of this invention, will first be described.

The exemplary suspension system includes a rigid frame means 10, a pivotally mounted suspension assembly or support front frame means 11, a pivotally mounted rear suspension assembly or support frame means 12, the front and rear support means 11 and 12 yieldably and resiliently supporting a vehicle body 14, only portions of which are shown in FIG. 1. An endless driven track 15 of suitable track design is provided with slidable engagement at 16 with rigid frame 10 in conventional snowmobile manner. Track 15 may be driven by drive sprockets 17 associated with power means, not shown, such driving arrangement not forming part of the present invention.

Rigid frame 10 may comprise a pair of spaced parallel elongated rails 20 having slightly upwardly curved portions at their front ends and interconnected by a plurality of longitudinally spaced front transverse members 21 and 22, an intermediate transverse member 23, and rear transverse members 24 and 25. Transverse members 24-25 inclusive also serve other functions with respect to the suspension system as described in detail hereinafter.

The bottom surface of each rail 20 may be provided with a suitable skid strip, not shown, for contacting a smooth inner surface of the endless driven track 15 as is well-known in the snowmobile art.

The front support frame means 11 may comprise a pair of parallel elongated longitudinally extending front support members 30 connected at their lower ends as by welding to a pivotally mounted tube 31 of transverse member 22 and reinforced by gusset plates 32. Tube 31 is ensleeved over and pivotally mounted about an axis provided by an interior through rod 33 which is supported by upstanding, aligned pedestals or brackets 34 secured in suitable manner to rails 20. Forward upper ends of front support members 30 are similarly welded to a transverse cylindrical tube 35 and reinforced by gussets 36. Transverse tube 35 may be ensleeved over a through rod 37 which extends outboardly of each side of rigid frame 10 for a suitable connection to vehicle body 14. Tube 35 is mounted for limited pivotal movement about the axis of rod 37. The pivotal connections of the support frame 11 about the axes of rods 33 and 37 provide swinging of front support frame 11 in a limited arc about the axis of rod 33.

Means for resiliently yieldably controlling movement of front support frame 11 in such limited arc may include front torsion springs 39 carried on outboard ends of transverse tube 35 and rod 37 which extend outboardly of rails 20. Each front spring 39 has a preselected number of helical turns therein to provide a desired torsion spring resistance. One end of each torsion spring 39 may terminate in a spring arm 40 which, in this example, extends rearwardly and upwardly for bearing against a spring arm keeper or bracket 41 suitably attached to vehicle body 14 at a predetermined location. Each torsion spring 39 also includes a rearwardly extending spring arm 42 of selected length for cooperable variable contact with front cam member 43 for progressively varying the spring rate of spring 39 as more fully described.

Front cam member 43 of suitable material may be secured by nut and bolt assemblies 44 to rail 20 at approximately the beginning of the upwardly curved front end portion of the rail. Cam member 43 may support ends of transverse member 21 which includes a through bolt assembly 45 and which supports between ends thereof a guide wheel 46 cooperable with the bottom lay of endless track 15.

Cam means 43, FIG. 5, is provided with a cam edge face 48 having a preselected curvature. Front torsion spring arm 42 is biased to contact cam edge face 48 at different points along the lengths of both arm 42 and cam edge face 48 as the front support frame 11 moves in its arc about the pivotal axis of rod 33. It will be readily apparent that the effective length of spring arm 42 is varied by such movement, the effective length being measured from the point of contact with the cam edge face 48 and the tangential point of contact of the other end of arm 42 with the outboard extension of transverse tube 35. The spring rate of the torsion spring 39 is thus varied in a progressive manner.

Cam edge face 48 may be provided within an edge channel or groove 49 on cam member 43 for receiving and retaining arm 42 against lateral displacement thereof which might cause disengagement of cam arm 42 from cam member 43. Other suitable means may be provided for maintaining the cooperable relationship between arm 42 and cam edge face 48.

Rear support frame 12 of the suspension system is somewhat similar to the front support frame 11, except that means are provided for permitting movement of the lower pivotal axis of the rear support frame which corresponds to the pivotal axis provided by rod 33 of the front support frame. Rear support frame 12 includes transverse member 24, which has at each end a pivotal connection at 52 to an upper and rearwardly extending end of a link 53. Pivotal connections 52 to transverse member 24 define an axis about which rear support frame 12 may swing in a limited arc. Lower ends of links 53 are provided a pivotal connection at 54 to an upstanding bracket 55 secured as by nut and bolt assemblies 56 to rail 20 at a point spaced from the rear end of rail 20. Rear support frame 12 also includes a pair of rearwardly extending parallel longitudinal support members 58 suitably welded at their lower forward ends to member 24 and similarly secured at their rearward ends to transverse tube 59. Tube 59 may be ensleeved over a through rod 60 having outboard ends pivotally secured and mounted in vehicle body 14. Rear support frame 12 comprising transverse member 24, longitudinal members 58 and transverse tube 59 is adapted to be moved in an arc about the axis of member 24. The axis of member 24 is movable in an arc about the pivotal connections at 54 of links 53 with the brackets 55. Arcuate movement of the pivot axis of member 24 provides horizontal and vertical displacement of member 24 which also causes corresponding vertical and horizontal displacement of rear support frame 12.

Means for controlling and dampening such vertical and horizontal displacement of rear support frame 12 about the axis of member 24 is provided by a piston and cylinder type shock absorber 62. Shock absorber 62 may be positioned along the longitudinal axis of rigid frame 10 and pivotally connected at 63 to transverse member 23. The opposite end of shock absorber 62 which may include the end of piston rod 64 may be pivotally connected at 65 to the lower end of a bell crank arm 66. Crank arm 66 may be suitably secured as by welding to transverse member 24 and may form an included angle of slightly less than 90° with the parallel support members 58 of the support frame 12. The crank arm 64, transverse member 24, and pair of longitudinal support members 58 provide a bell crank lever system pivotally movable about the axis of member 24.

Intermediate transverse member 23 may be suitably supported from upstanding brackets 69 secured to rails 20 intermediate ends of rails 20.

As in the front support suspension frame means 11, the rear support frame 12 includes outboard extensions of tube 59 for carrying torsion spring means 72, each of a selected number of turns, to provide a predetermined spring resistance. Each torsion spring 72 includes an end spring arm 73 which may extend rearwardly and upwardly and may be retained by a suitable keeper or lug 74 positioned and secured to vehicle body 14. Each torsion spring 72 also includes a rearwardly extending rear spring arm 75 having cooperable contact and engagement with a rear cam member 76. Each rear cam member 76 includes a cam edge face 81 formed in the bottom of an edge groove or channel 82 which receives rear spring arm 75 for variable contact therewith along the length of cam edge face 81 and spring arm 75 so as to vary the effective length of spring arm 75. A preselected variable spring rate of torsion spring 72 is thereby provided in a manner similar to that described with respect to the cooperable front cam members 43 and front spring arms 42.

Each cam member 76 may be slidably carried by rail 20 adjacent the rear end of rail 20. Each cam member 76 is provided with a connection to rear transverse member 25 which includes a through rod or bolt 77. Transverse member 25 including each cam member 76, is adjusted longitudinally of rails 20 by adjustment means 78 in well-known manner. Transverse member 25 may also carry a plurality of spaced guide wheels 79 for engagement with endless drive track 15 around the rear end of rigid frame 10.

The operation of the suspension system described above and the manner in which it provides a progressive spring rate for a torsion spring to achieve a desired suspension action under heavy loads or under very bumpy terrain is fully described in said copending application Ser. No. 963,913 and since it is not part of this invention, the detailed description of the operation of the suspension system is incorporated herein only by reference.

Before describing in detail the constant tension track means of this invention generally indicated at 82, the travel modes or conditions of the endless track 15 should be noted. Vehicle body 14 is connected to the suspension system through rear transverse rod 60, and front transverse rod 37. Drive wheels 17, which are supported by the vehicle body, are connected to the vehicle body through drive wheel axials, axle or shaft 83. The pivot axes of shaft 83, transverse rods 37 and 60 are in fixed relative position with respect to the vehicle body. During a normal first travel mode, the relative positions of the axes of the shaft 83 and rods 37 and 60 are relatively unchanged. In a second travel mode or condition, the vehicle body may be considered to be tilted forwardly and downwardly under which circumstances the axis of rod 60 moves upwardly relative to the rear support and guide wheels 79, the front rod 37 moving relatively downwardly. In a third travel mode or condition, the front end of the snowmobile body is moved upwardly to a maximum extent, the axis of transverse rod 37 of the suspension system moving upwardly and the axis of the rear transverse rod 60 moving downwardly to its maximum extent. This variation of pitching movement of the vehicle body, which is reflected in corresponding movement of the front and rear suspension means and the relative changes in position of the pivot axes of the suspension means, causes the endless track to be subjected to changes in length and consequently changes in track tension.

In this example of the invention, the constant track tension means 82, which is illustrated at the rear suspension frame means, may comprise a bracket 85 secured in fixed angular relation to the rotatably mounted transverse tube 59 at approximately the longitudinal center line of the snowmobile. Bracket 85 carries an elongated curved member 86 of suitable material having a cam edge 87 of preselected curvature to contact the bottom surface of the top lay of the endless track 15 under all conditions of movement of the rear suspension frame means during operation of the vehicle. The cam edge 87 is designed so that at varying positions of rear suspension frame 12 the cam surface 87 of the cam member 86 will maintain pressure contact on the endless track 15 to provide substantially constant tension therein during movement of the suspension system.

It will be apparent that since the bracket 85 is rigidly fixed to the rotatable or pivotally mounted transverse tube 59 that upward and downward swinging movement of the rear suspension frame 12 will change the position of the cam surface 87 in relation to the top lay of endless track 15 so that contact with the endless track 15 will be made at different areas of the cam surface. This is readily apparent from a consideration of FIGS. 2 and 3 where in FIG. 2 the suspension system is collapsed and tube 59 of the rear suspension frame is spaced a considerable distance from the top lay bottom surface of the endless track. In FIG. 3 where the rear suspension frame is at an uppermost position, it will be apparent that the tube 59 has been partially turned or rotated about the axis of rod 60 and that the axis of tube 59 is closer to the bottom surface of the top lay of track 15.

It will be apparent that the contact of the cam surface 87 with endless track 15 compensates for the responsive movements of the suspension system to loading or variations in terrain and maintains such contact in a nonlinear manner in order to maintain the uniformity of tension in the endless track.

Endless track 15 is provided with a preselected tension in usual manner. In this example, the rear end support and guide wheels 79 are readily adjusted longitudinally of the rigid frame by the adjustment bolts 78. The tension, which is preselected, may be determined in usual manner also, such as by tensioning the endless track by adjustment of the bolts 78 until the top lay of endless track is capable of being depressed approximately ¾" from its normal path between the rear guide wheel 79 and the drive wheels 17. During operation, the configured cam surface 87, which moves in response to action of the rear frame suspension means, maintains pressure contact with the top lay so as to substantially maintain the preselected track tension.

In FIGS. 6–8 inclusive, a cam member 90 is utilized on the front frame suspension means 11 in order to more finely adjust and maintain uniform tension in the track 15.

Cam member 90 is carried by a suitable bracket 91 which is fixedly secured to rotatable tube 35 in fixed angular relation to front suspension frame members 30. Thus, as in the prior example, as the front suspension frame means 11 responds to variations of loading or terrain and tube 35 turns with respect to the axis of rod 37, the position of bracket 91 and cam member 90 turns with tube 35 and thus changes the engagement of cam surface 92 with the bottom surface of the track 15 as in the prior embodiment. The configuration of cam surface 92 is determined by the amount of suspension travel of the front suspension means 11 and the shape of cam surface 92. As in the example of the constant tension track means associated with the rear frame suspension means 12, the cam member 90 will function and operate in similar manner. While in many instances a constant tension track means may not be required for a front suspension means, in suspension systems in which suspension travel has been maximized and where the extreme modes or conditions of travel as described above are encountered, the provision of a constant track tension means with the front suspension means enables the maintenance of uniform tension on the track means under more difficult conditions.

It will be understood that while the constant tension track means of this invention has been described with respect to the above exemplary suspension system the cam members may be associated with suspension systems of different types in order to maintain uniform track tension. It will be further understood that when the means of this invention are so associated with different suspension systems that there may be some modifications in the location and configuration of the cam member in order to provide the desired uniform tension of the track.

Various modifications and changes may be made in the constant tension track means described above which come within the spirit of this invention and all such changes and modifications coming within the scope of the appended claims are embraced thereby.

We claim:

1. In combination with a suspension system for a track type vehicle having an endless track means under preselected tension in one position of the suspension system, the suspension system pivotally interconnecting a rigid frame of the vehicle and the vehicle body, and having a transverse suspension member mounted for pivotal movement about its axis, the provision of:
    an elongated cam member fixedly carried by said transverse suspension member and having a cam surface engaged by said track means and extending in the direction of travel thereof,
    said cam surface being contoured to maintain said track means under said selected tension with minimal variation of such tension during pivotal movement of the transverse suspension member.

2. In the combination as stated in claim 1 wherein said transverse suspension member is located adjacent one end of the endless track means;
    and wherein the elongated cam member supported therefrom has pressure engagement with the bottom surface of the top lay of said endless track means.

3. In combination with a suspension system for a track type vehicle having an endless track means under preselected tension in one position of the suspension system, the suspension system pivotally interconnecting a rigid frame of the vehicle and the vehicle body, and having transverse suspension members adjacent opposite ends of the track means, each member being provided with a pivot axis, the provision of:
    an elongated cam member supported by each of said transverse suspension members and having a cam surface in pressure engagement with the bottom surface of the top lay of said track means and extending in the direction of travel thereof,
    each of said cam surfaces being contoured to maintain said track means under said selected tension with minimal variation of said tension during movement of the suspension system.

4. In a track type vehicle having an endless track means under preselected tension and provided with a bottom ground engaging track lay and an upper track lay, said vehicle having a suspension member between said track lays, the combination of:
    means for minimizing variation in said preselected tension of the endless track means including
    means carried by the suspension member in fixed relation thereto and in continuous varying pressure contact with the bottom surface of the upper track lay to compensate for movement of the suspension member which causes a variation in tension of the track means.

5. In a vehicle as stated in claim 4 wherein said means to compensate for movement of the suspension member includes a cam member having a cam surface of selected configuration for contact with said upper track lay.

6. In a method for minimizing variation in preselected tension of an endless track means provided with relatively fixed end support and guide means and with a relatively movable suspension system, the steps of:
    presetting a selected tension in the endless track means including contacting a cam member with said track means with the track and suspension system in one position;
    and nonlinearly compensating for variations in tension forces acting upon said endless track means during changes in position of said relatively movable suspension system and said cam member with respect to said track means, said suspension system and cam member having fixed relation.

7. A constant track tension means for an endless track on a vehicle having a vehicle body and a rigid frame, the combination of:
    a suspension frame assembly having one end pivotally connected to the frame and its other end provided with a transverse member connected to the vehicle body;
    and cam means including a cam member having a cam surface for contact with said track means,
    said cam member being fixedly connected to said transverse member at a selected angle to said suspension frame assembly.

* * * * *